United States Patent
Kim

(10) Patent No.: US 10,642,420 B2
(45) Date of Patent: May 5, 2020

(54) TOUCH SCREEN APPARATUS THAT COMPENSATES TOUCH FORCE USING MEASURED TEMPERATURE AND ELECTRONIC DEVICE COMPRISING THE SAME

(71) Applicant: LG DISPLAY CO., LTD., Seoul (KR)

(72) Inventor: Eunjung Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/189,000

(22) Filed: Nov. 13, 2018

(65) Prior Publication Data
US 2019/0155450 A1    May 23, 2019

(30) Foreign Application Priority Data
Nov. 17, 2017  (KR) ......................... 10-2017-0154143

(51) Int. Cl.
| | | |
|---|---|---|
| G06F 3/041 | (2006.01) | |
| G01L 1/14 | (2006.01) | |
| G01L 1/26 | (2006.01) | |
| G06F 3/044 | (2006.01) | |

(52) U.S. Cl.
CPC .............. *G06F 3/0418* (2013.01); *G01L 1/14* (2013.01); *G01L 1/146* (2013.01); *G01L 1/26* (2013.01); *G06F 3/044* (2013.01); *G06F 2203/04105* (2013.01)

(58) Field of Classification Search
CPC ................... G06F 3/0418; G06F 3/044; G06F 2203/04105; G01L 1/146; G01L 1/26; G01L 1/14
See application file for complete search history.

(56) References Cited

U.S. PATENT DOCUMENTS

| | | | |
|---|---|---|---|
| 10,048,792 B1* | 8/2018 | Schediwy | G06F 3/0418 |
| 2013/0298688 A1* | 11/2013 | Wade | G01L 1/18 |
| | | | 73/766 |
| 2016/0048266 A1* | 2/2016 | Smith | G06F 3/0418 |
| | | | 345/174 |
| 2017/0031495 A1* | 2/2017 | Smith | G06F 3/0416 |
| 2017/0242505 A1* | 8/2017 | Vandermeijden | G01K 3/14 |
| 2017/0300161 A1* | 10/2017 | Filiz | G01L 1/205 |
| 2018/0107302 A1* | 4/2018 | Takada | G02B 6/0051 |

FOREIGN PATENT DOCUMENTS

| | | |
|---|---|---|
| CN | 105373258 A | 3/2016 |
| CN | 105426005 A | 3/2016 |
| CN | 105653097 A | 6/2016 |
| CN | 106354328 A | 1/2017 |
| TW | 201719345 A | 6/2017 |

OTHER PUBLICATIONS

Taiwanese Office Action dated Jul. 18, 2019 issued in Taiwanese Patent Application No. 107140867.

\* cited by examiner

*Primary Examiner* — Ryan A Lubit
(74) *Attorney, Agent, or Firm* — Polsinelli PC

(57) ABSTRACT

Disclosed herein is a touch screen apparatus. The touch screen apparatus includes a touch screen including a touch sensor, a temperature sensing unit to measure a temperature of the touch screen, and a touch driving circuit connected to the touch screen to generate touch position data and touch force level data and correct the touch force level data according to a temperature input from the temperature sensing unit.

20 Claims, 10 Drawing Sheets

TOUCH SCREEN APPARATUS THAT COMPENSATES TOUCH FORCE USING MEASURED TEMPERATURE AND ELECTRONIC DEVICE COMPRISING THE SAME

CROSS REFERENCE TO RELATED APPLICATION

This application claims the priority of Korean Patent Application No. 10-2017-0154143 filed on Nov. 17, 2017, in the Korean Intellectual Property Office, the disclosure of which is hereby incorporated by reference in its entirety.

BACKGROUND

Field of the Disclosure

The present disclosure relates to a display device, and more particularly, to a touch screen apparatus and electronic device comprising the same. Although the present disclosure is suitable for a wide scope of applications, it is particularly suitable for enhancing force touch sensitivity by compensating a touch force sensed by a touch sensor according to a temperature in a touch screen apparatus, and an electronic device including the touch screen apparatus.

Description of the Background

A touch screen apparatus is a type of an input apparatus to input information through screen contact of a display apparatus without a separate input apparatus in various electronic devices. Such a touch screen apparatus has been used as an input apparatus for not only portable electronic devices such as, for example, an electronic notebook, an electronic book, a portable multimedia player (PMP), a navigation device, an ultra-mobile PC (UMPC), a mobile phone, a smart phone, a smart watch, a tablet PC, a watch phone, and a mobile communication terminal, but also various products such as, for example, a television, a notebook, and a monitor.

However, a conventional touch screen apparatus may detect only a touch position of the electronic device and input information only with respect to a content displayed in a touched area. That is, it is only possible to touch a content displayed on a screen of the electronic device and passively input the touched content. Thus, the conventional touch screen apparatus has a limitation with respect to information input.

SUMMARY

Aspects of the present disclosure provide a touch screen apparatus which may make it possible to perform a precise touch all the time by compensating touch force level data according to a temperature measured by a temperature sensor provided in a touch screen, and an electronic device including the same.

According to aspects of the present disclosure, there is provided a touch screen apparatus. The touch screen apparatus may include a touch screen including a touch sensor, a temperature sensing unit to measure a temperature of the touch screen, and a touch driving circuit connected to the touch screen to generate touch position data and touch force level data and correct the touch force level data according to a temperature input from the temperature sensing unit.

In another aspect of the present disclosure, there is provided a touch screen apparatus comprises a touch screen having first and second touch sensing units, wherein the first touch sensing unit measures a touch position of a touch input object and the second touch sensing unit measures a touch force of the touch input object; a temperature sensing unit having a temperature sensor measuring a temperature of the touch screen; and a touch driving circuit connected to the touch screen, generating touch position data and touch force level data, and correcting the touch force level data in accordance with the measured temperature at the temperature sensing unit, wherein the temperature sensor is connected to touch driving circuit when a first touch is detected at the first and second touch sensing units after the touch screen is in a sleep mode and connected to ground when no touch input object is detected at the first and second touch sensing units.

The touch sensor may include a first touch sensing unit to sense a touch position of a touch input object, and a second touch sensing unit to sense a touch force of the touch input object. Here, the second touch sensing unit may include a force sensing electrode disposed on the first substrate, and a force driving electrode disposed on the second substrate, and a resistor member disposed between the force sensing electrode and the force driving electrode.

The temperature sensing unit may include a temperature sensor disposed on at least one of the first substrate and the second substrate and a switching element to selectively connect the temperature sensor to a ground or a touch driving circuit. The temperature sensor connected to the ground may discharge static electricity to the outside.

The touch driving circuit may include a sensing unit to generate a touch driving signal, supply the touch driving signal to the first touch sensing unit and generate a first touch raw data according to a touch position input from the first touch sensing unit, and to generate a force driving signal, supply the force driving signal to the second touch sensing unit and generate a second touch raw data according to a touch force input from the second touch sensing unit, and a touch control circuit to control driving timing according to a touch sync signal, generate touch force level data based on the second touch raw data, and correct the touch force level data based on a temperature input from the temperature sensing unit. The touch driving circuit may include a memory unit provided with a first lookup table and a second lookup table to supply a temperature compensation coefficient to a driving control circuit.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
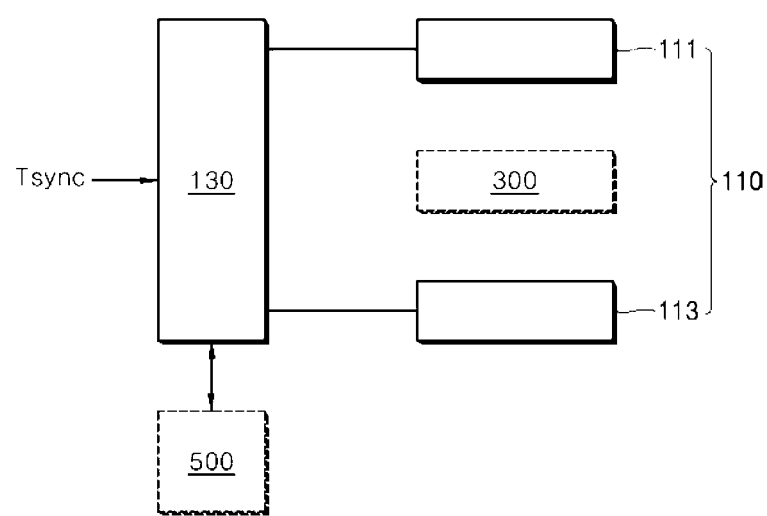
FIG. 1 is a block diagram schematically showing a touch screen apparatus according to an aspect of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

It is to be noted that the terms "comprising", "having", "including" and the like used in the description and the claims should not be interpreted as being restricted to the means listed thereafter unless specially stated otherwise. Where an indefinite or definite article is used when referring to a singular noun, e.g. "a," "an," "the," this includes a plural of that noun unless specifically stated otherwise.

In relation to interpreting an element, the element is interpreted as including an error range although there is no explicit description.

In relation to describing a positional relationship using phrases such as "element A on element B," "element A above element B," "element A below element B" and "element A next to element B," and the like, another element C may be arranged between the elements A and B unless the term "immediately" or "directly" is explicitly used.

In relation to describing a temporal relationship, terms such as "after," "subsequent to," "next to," "before," and the like may include cases where any two events are not consecutive, unless the term "immediately" or "directly" is explicitly used.

In relation to describing elements, terms such as "first" and "second" are used, but the elements are not limited by these terms. These terms are simply used to distinguish one element from another. Accordingly, as used herein, a first element may be a second element within the technical idea of the present disclosure.

"First horizontal axis direction", "second horizontal axis direction", and "vertical axis direction" should not be construed only as being in a geometric relationship in which these directions are perpendicular to each other, but may have a wider directionality in a range to which the configuration of the present disclosure can be functionally applied.

The term "at least one" should be understood as including all possible combinations which can be suggested from one or more relevant items. For example, the meaning of "at least one of a first item, a second item, and a third item" may be each one of the first item, the second item, or the third item and also be all possible combinations which can be suggested from two or more of the first item, the second item, and the third item.

The features of various aspects of the present disclosure can be partially or entirely bonded to or combined with each other and can be interlocked and operated in technically various ways as can be fully understood by those skilled in the art, and the various aspects can be carried out independently of or in association with each other.

Hereinafter, a touch screen apparatus according to aspects of the present disclosure and an electronic device including the touch screen apparatus will be described in detail with reference to the accompanying drawings. Regarding, the reference numerals assigned to the elements in the drawings, it should be noted that the same elements will be designated by the same reference numerals, wherever possible, even though they are shown in different drawings.

The touch screen apparatus may include a touch screen to sense a touch force in addition to a touch screen to sense a touch position, so that the touch screen apparatus may not merely sense a touch position but also input various types of information according to a magnitude of force.

The touch screen apparatus may be provided in the electronic device including various types of applications to allow the application to perform different operations depending on a touch force.

In order to detect a force of the touch screen, the touch screen apparatus may include a touch screen to detect a touch force in addition to a conventional touch screen to recognize a touch position. The touch screen apparatus including these two touch screens may simultaneously detect the touch position and touch force.

Also, the touch screen apparatus including a temperature sensor may precisely measure a touch pressure by compensating the touch pressure according to a temperature. The temperature sensor may be used as a wiring for discharging static electricity when a touch operation is not performed.

FIG. 1 is a block diagram schematically showing a touch screen apparatus according to an aspect of the present disclosure.

As shown in FIG. 1, the touch screen apparatus according to an aspect of the present disclosure may include a touch screen 110 having a touch sensor and a touch driving circuit 130 connected to the touch screen 110.

The touch screen 110 may have a configuration for sensing a touch position and a touch force of a touch input object to provide an input interface through a touch. Here, the touch input object may be a part of a human body such as, e.g., a finger or a conductive input device such as, e.g., a stylus pen. The touch screen 110 may include a first touch sensing unit 111 to sense a touch position and a second touch sensing unit 113 to sense a touch force.

The first touch sensing unit 111 may be disposed to overlap the display panel 300 to display an image. For example, the first touch sensing unit 111 may be disposed in front of a screen of the display panel 300 or inside the display panel 300. The first touch sensing unit 111 may include a plurality of first touch sensors whose mutual capacitances or self capacitances change according to a method of sensing a touch signal.

Each of the plurality of first touch sensors may sense a touch position of the touch input object touched on the touch screen 110. When the first touch sensor is a mutual capacitance type touch sensor, the mutual capacitance of the first touch sensor may be formed between a touch driving electrode and a touch sensing electrode, and the mutual capacitance may decrease to recognize a touch when the touch input object touches the touch screen 110. When the first touch sensor is a self-capacitance type touch sensor, the self-capacitance of the first touch sensor may be formed between a touch electrode and the touch input object, and the self-capacitance of the touch input object may increase to recognize a touch when the touch input object touches the touch screen 110.

The second touch sensing unit 113 may be disposed outside the display panel 300. For example, the second touch sensing unit 113 may be disposed on a rear surface of the display panel 300 or on a front surface of the first touch sensing unit 111. The second touch sensing unit 113 may include a plurality of second touch sensors whose resistance values change according to a touch force of the touch input object.

Each of the second touch sensors to sense a touch force of the touch input object may include resistance selectively formed between at least one force driving electrode and at least one force sensing electrode. The resistance value of the second touch sensor may change according to a contact area between the force driving electrode and the force sensing electrode with the resistor member positioned therebetween. Here, the contact area may change according to a touch force (or a touch pressure) of the touch input object.

Also, the second touch sensing unit 113 may include a temperature sensor whose resistance value changes according to a temperature. The temperature sensor to prevent an error by compensating a touch force of the second touch sensor which changes according to a temperature may be disposed in an outer area of the second touch sensing unit 113.

The touch driving circuit 130 may be connected to the touch screen 110 to sense a touch position and a touch force of the touch input object with respect to the touch screen 110.

The touch driving circuit 130 may sense a touch position through the plurality of first touch sensors provided in the first touch sensing unit 111 and a touch force through the plurality of second touch sensors provided in second sensing unit 113, based on a touch sync signal Tsync. That is, the touch driving circuit 130 may generate first touch raw data by sensing electrical changes of the first touch sensors and second touch raw data by sensing electrical changes of the second touch sensors; generate touch position data based on the first touch raw data, and touch force level data based on the second touch raw data; generate three dimensional touch information TI including the touch position data and the touch force level data; and, output the generated three dimensional touch information TI to an external host control circuit 500. Here, the touch position data may be defined as digital information of an X-axis coordinate and a Y-axis coordinate with respect to the touch position, and the touch force level data may be defined as digital information of a Z-axis coordinate or a touch force level with respect to the touch position.

The touch driving circuit 130 may correct the touch force level data based on the temperature measured by the temperature sensor disposed in the second touch sensing unit 113, and then generate three dimensional touch information TI including the touch position data and the corrected touch force level data to output the generated three dimensional touch information TI to the external host control circuit 500.

The touch driving circuit 130 may simultaneously sense the touch position through the first touch sensors and the touch force through the second touch sensors, or may sense the touch force after sensing the touch position. Alternatively, the touch driving circuit 130 may sense the touch position after sensing the touch force.

The touch driving circuit 130 may store a resistance value which changes according to a temperature measured by the temperature sensor, a change rate of the touch force sensed by the second touch sensor according to a temperature, and a compensation coefficient value of a force which changes according to a temperature in the memory unit. Also, the touch driving circuit 130 may compensate the touch force level data based on the compensation coefficient value of the force which changes according to the stored temperature.

Figure 2:
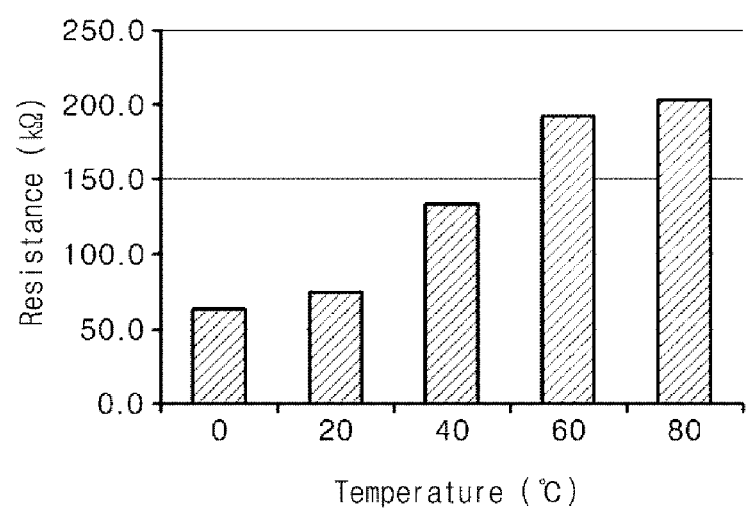
FIG. 2 is a graph showing a change in a resistance value of a touch sensor according to a temperature change.

As shown in FIG. 2, the second touch sensor of the second touch sensing unit 113 may have a property that a resistance value changes according to a temperature. For example, resistance value of the second touch sensor may increase in line with a temperature increase.

Figure 3:
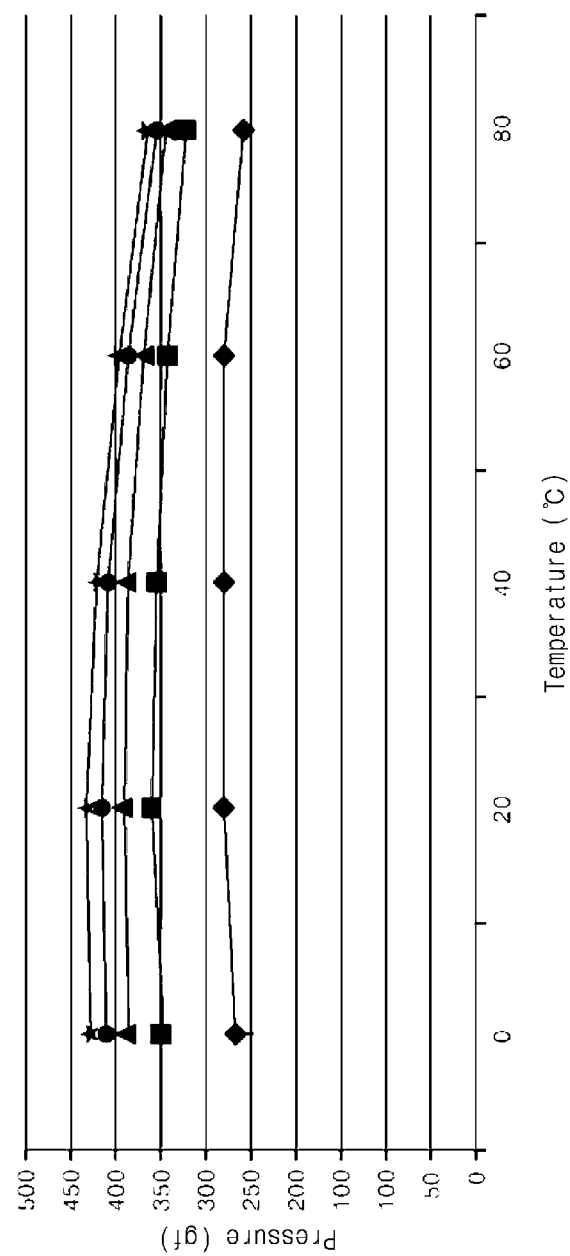
FIG. 3 is a graph showing a change in touch force level data according to a temperature change.

As shown in FIG. 3, when the resistance value increases in line with a temperature increase, the touch force level data sensed by the second touch sensor of the second sensing unit 113 may decrease.

For example, even when the same touch force is applied, touch force level data of about 355 gf may be sensed by the second touch sensor at a temperature of 20° C., whereas touch force level data of about 350 gf and touch force level data of about 320 gf may be sensed at temperatures 40° C. and 80° C., respectively. That is, the sensed touch force level data may decrease according to a temperature increase. Even when different touch forces are applied, the touch force level data may decrease according to a temperature increase.

Therefore, the touch driving circuit 130 according to aspects of the present disclosure may compensate the touch force level data based on the temperature sensed by the temperature sensor provided in the second touch sensing unit. Thus, the second touch sensor may more precisely sense the touch force without variation according to a temperature.

As described above, the touch driving circuit 130 may compensate the variation according to the temperature measured by the temperature sensor with respect to the same touch force, and thus it is possible to more precisely sense the touch force of the second touch sensor.

Here, the touch driving circuit 130 may compensate the sensed touch force level data of the second touch sensor according to a temperature. For example, the touch driving circuit 130 may compensate the touch force level data based on a compensation coefficient value which changes according to a temperature stored in the memory unit.

The host control circuit 500 may be an application processor of the electronic device having a touch screen 110. The host control circuit 500 may receive the three dimensional touch information TI output from the touch driving circuit 130 and execute an application corresponding to the received three dimensional touch information TI.

The touch screen apparatus may compensate variation of a touch force value according to a temperature with respect to the same touch force by compensating the touch force level data based on the temperature measured by the temperature sensor, thereby more precisely sensing the touch force.

Hereinafter, the aspects of the present disclosure will be described in more detail with reference to the accompanying drawings.

Figure 4:
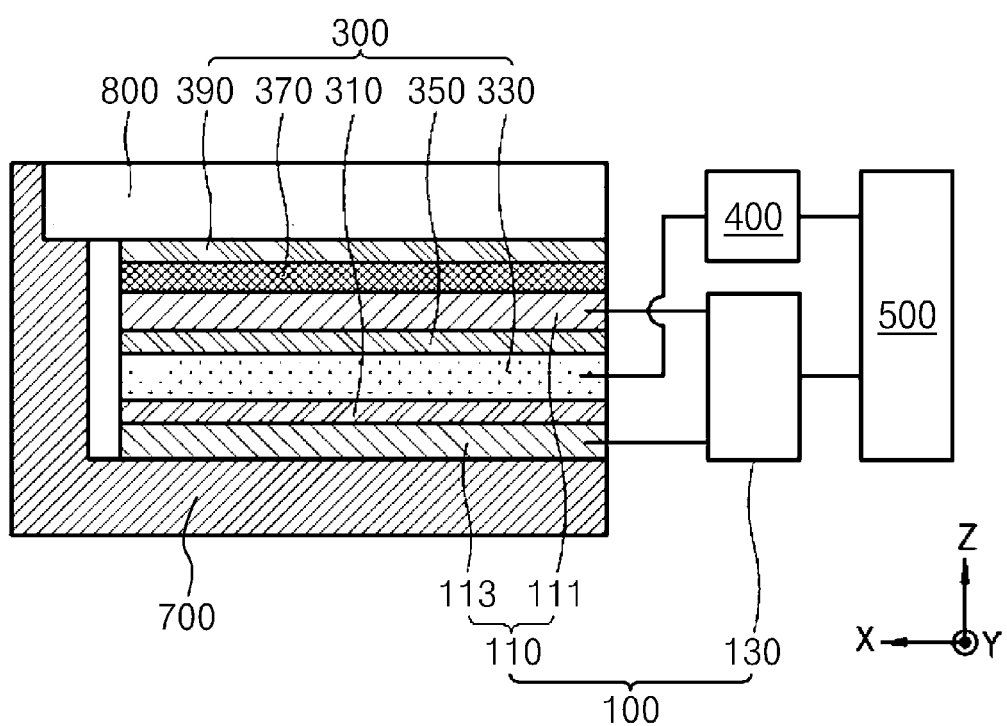
FIG. 4 is a schematic cross-sectional view of an electronic device according to an aspect of the present disclosure.

FIG. 4 is a cross-sectional view showing a structure of an electronic device having a touch screen shown in FIG. 1.

As shown in FIG. 4, the electronic device according to aspects of the present disclosure may include a housing 700, a cover window 800, a display panel 300, a driving circuit 400, a touch screen apparatus 100, and a host control circuit 500.

The housing 700 may include a bottom surface and a side wall perpendicular to an edge of the bottom surface. A storage space may be provided on the bottom surface surrounded by the side wall. The display panel 300 and the touch screen apparatus 100 may be provided in the storage space.

The cover window 800 may be provided on the side wall of the housing 700 to cover the storage space of the housing 700. A buffer member such as, for example, a foam pad may be disposed between the side wall of the housing 700 and the cover window 800.

The display panel 300 may be an organic light emitting display panel that displays an image using light emission of an organic light emitting diode. In addition, the display panel 300 is not limited to the organic light emitting display panel, but may be various display panels such as a liquid crystal display panel, an electrophoretic display panel, and a micro LED display panel. Here, the display panel 300 may have various shapes such as, for example, a planar shape, a curved shape, and a bent shape.

The display panel 300 may include an array substrate 310, an array layer 330, an encapsulation layer 350, and a light control film 370. The array substrate 310 may support the array layer 330. The array layer 310 may be made of a transparent material such as, e.g., glass or a flexible plastic material such as, e.g., polyimide.

The array layer 330 may include pixels defined by a plurality of gate lines and a plurality of data lines that intersect each other. Each pixel may include a switching transistor connected to a gate line and a data line, a driving transistor that receives a data signal from the switching transistor, and an organic light emitting diode that emits light by means of a data current supplied from the driving transistor. Here, the organic light emitting diode may include an anode electrode connected to the driving transistor, an organic light emitting layer provided on the anode electrode, and a cathode electrode provided on the organic light emitting layer.

When the display panel 300 is a liquid crystal display panel, the array layer 330 may include a liquid crystal layer that implements an image by adjusting transmittance of light transmitted according to an arrangement of liquid crystal molecules.

The encapsulation layer 350 may be disposed on the array substrate 310 to cover the array layer 330, thereby protecting the organic light emitting diode from oxygen or moisture.

The light control film 370 may be disposed on the encapsulation layer 350 to improve luminance property of light emitted from each pixel. For example, the light control film 370 may be a polarizing film to polarize light emitted from each pixel, or an optical film capable of improving the luminance property of light emitted from each pixel A transparent adhesive member 390 may be applied to an upper surface of the display panel 300 and the cover window 800 may be disposed thereon, so that the cover window 800 may be attached to the display panel 300. Here, the transparent adhesive member 390 may be an optical clear adhesive (OCA) or an optical clear resin (OCR), but is not limited thereto.

The driving circuit 400 may display an image on the display panel 300. The driving circuit 400 may be a driving integrated circuit mounted on a chip mounting area of the array substrate 310. In this case, the driving circuit 400 may be connected to a pad unit formed on the array substrate 310, connected to the plurality of data lines on a one-to-one basis, and connected to a scan driving circuit.

The driving circuit 400 may receive a digital image data, a timing sync signal, a driving power, and a cathode power supplied from the host control circuit 500 through a flexible printed circuit board and the pad unit.

For example, the driving circuit 400 may arrange the digital image data into pixel-by-pixel data so as to correspond to an arrangement of the plurality of pixels of the display panel 300 according to the timing sync signal, convert the pixel-by-pixel data into a pixel-by-pixel data signal, and supply the converted pixel-by-pixel data signal to a corresponding pixel through a corresponding data line. In addition, the driving circuit 400 may supply the cathode power to the cathode electrode which is connected to each pixel in common. At the same time, the driving circuit 400 may generate a scan control signal according to the timing sync signal, and provide the generated scan control signal to the scan driving circuit.

The driving circuit 400 may be mounted on the flexible printed circuit board. In this case, the driving circuit 400 may receive the digital image data, timing sync signal, driving power and cathode power supplied from the host control circuit 500 through the flexible printed circuit board, and may supply the pixel-by-pixel data signal to the corresponding data line, supply the cathode power to the cathode electrode, and supply the scan control signal to the scan driving circuit through the pad unit.

The touch screen apparatus 100 may include the touch screen 110 and touch driving circuit 130. The touch screen 110 may include the first touch sensing unit 111 to sense a touch position of the touch input object and the second touch sensing unit 113 to sense a touch force of the touch input object.

The first touch sensing unit 111 may be disposed in front of the screen of the display panel 300 to display an image or inside the display panel 300 to sense the touch position of the touch input object that touches the cover window 800. For example, the first touch sensing unit 111 may be disposed on the light control film 370 or between the encapsulation layer 350 and the light control film 370. Here, the first touch sensing unit 111 is not limited to the above-described position but may be disposed anywhere within the display panel 300 The first touch sensing unit 111 may include a plurality of first touch sensors whose mutual capacitances or self-capacitances changes according to a touch. Here, mutual capacitance of each of the plurality of first touch sensors may be formed between the touch driving electrode and the touch sensing electrode, and may decrease when touched by the touch input object. The self-capacitance of each of the plurality of first touch sensors may be formed between the touch electrode and touch input object, and may increase when touched by the touch input object.

The second touch sensing unit 113 may sense a touch force level of the touch force of the touch input object with respect to the cover window 800. The second touch sensing unit 113 may be disposed between the display panel 300 and the bottom surface of the housing 700 or on a front surface of the first touch sensing unit 111.

When the second touch sensing unit 113 is disposed between the display panel 300 and the bottom surface of the housing 700, the second touch sensing unit 113 may serve as a heat conduction member to transfer heat of the display panel 300 to the housing 700 and dissipate the heat to the outside. When the second touch sensing unit 113 is disposed on the front surface of the first touch sensing unit 111, the touch input object may contact the second touch sensing unit 113 only through the cover window 800, thereby improving sensitivity for sensing the touch force.

Figure 5:
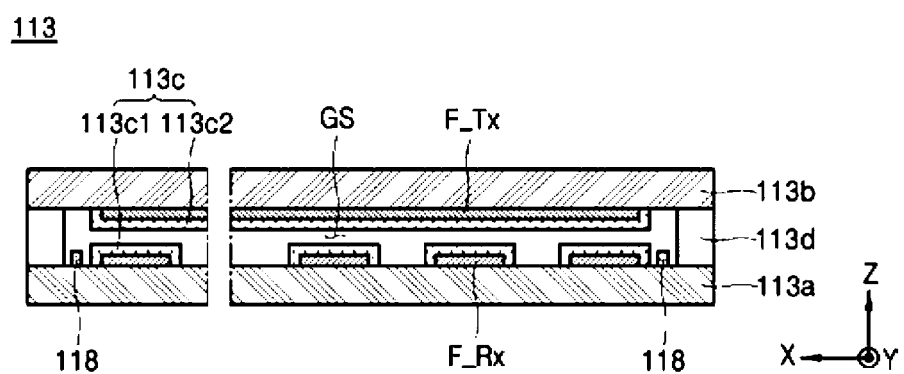
FIG. 5 is a cross-sectional view showing a structure of a second touch sensing unit shown in FIG. 4.

FIG. 5 shows a structure of a second touch sensing unit 113 according to an aspect of the present disclosure. As shown in FIG. 5, the second touch sensing unit 113 may include a first substrate 113a and a second substrate 113b, a force sensing electrode F_Rx formed on the first substrate 113a and a force driving electrode_Tx formed on the second substrate 113b, and a resistor member 113c disposed at an intersection of the force sensing electrode F_Rx and the force driving electrode F_Tx.

The first substrate 113a and the second substrate 113b may be made of a transparent plastic material such as, e.g., polyethyleneterephthalate (PET), but are not limited thereto. Transparent and flexible films made of various materials may be used as the first substrate 113a and the second substrate 113b.

The force sensing electrode F_Rx may be connected to the touch driving circuit 130 through a second force routing line, and the force driving electrode F_Tx may be connected to the touch driving circuit 130 through a first force routing line. The force sensing electrode F_Rx and the force driving electrode F_Tx may be made of metal such as, e.g., Ag, Au, Al, Mo, Ni, Fe, W, Cu, Pt or Zn. Here, the force sensing electrode F_Rx and the force driving electrode F_Tx may be made of the same metal or different metals.

The resistor member 113c may be disposed at the intersection of the force driving electrode F_Tx and the force sensing electrode F_Rx. The resistor member 113c may form a second touch sensor TS2, i.e., resistance in a contact area between the force driving electrode F_Tx and the force sensing electrode F_Rx according to a pressure touch of the touch input object. The contact area between the force driving electrode F_Tx and the force sensing electrode F_Rx that are in contact with the resistor member 113c may change according to a force touch of the touch input object with respect to the second substrate 113b, and the force touch of the touch input object may be sensed through a resistance value which changes according to the contact area.

The resistor member 113c may be formed on an upper surface of the first substrate 113a to cover a plurality of force sensing electrodes F_Rx. Also, the resistor member 113c may be provided on a rear surface of the second substrate 113b that faces the first substrate 113a to cover a plurality of force driving electrodes F_Tx. The resistor member 113c may have a single body structure, and accordingly the resistor member 113c is suitable to sense a single force touch.

As shown in the drawings, the resistor member 113c may include a plurality of first resistor patterns 113c1 and a plurality of second resistor patterns 113c2. Here, each of the plurality of first resistor patterns 113c1 may be formed on the upper surface of the first substrate 113a so as to cover the plurality of force sensing electrodes F_Rx, respectively.

That is, one of the first resistor patterns 113c1 may cover a corresponding one of the force sensing electrodes F_Rx. The plurality of second resistor patterns 113c2 may be formed on the rear surface of the second substrate 113b so as to cover the plurality of force driving electrodes F_Tx, respectively. That is, one of the second resistor patterns 113c2 may cover a corresponding one of the force driving electrodes F_Tx. The resistor member 113c is suitable to sense multiple force touches because the plurality of first resistor patterns 113c1 are separated from each other and the plurality of second resistor patterns 113c2 are separated from each other.

The resistor member 113c may be made of a pressure-sensitive adhesive material based on one of a quantum tunneling composite (QTC), an electro-active polymer (EAP), and an acryl and rubber based solvent, or a piezo-resistive material.

Here, the pressure-sensitive adhesive material may have a property that resistance changes according to a pressure. The piezoelectric resistive material having a piezoelectric resistance effect in which conduction energy is generated and a charge is move to a conduction energy band to change specific resistance when an external force is applied to a silicon semiconductor crystal may have a property that the specific resistance greatly changes according to a magnitude of the pressure.

The resistive member 113c may be coated on the first substrate 113a and/or the second substrate 113b by a printing process or may be attached to the first substrate 113a and/or the second substrate 113b by an adhesion process using an adhesive.

A temperature sensor 118 may be disposed on an outer peripheral portion of the first substrate 113a corresponding to a bezel area of the display panel 300. The temperature sensor 118 may be formed to have a strip-shaped metal pattern with a predetermined width. The temperature sensor 118 may be made of metal such as, e.g., Ag, Au, Al, Mo, Ni, Fe, W, Cu, Pt or Zn. In particular, the temperature sensor 118 may be made of metal different from the pressure sensing electrode F_Rx and the pressure driving electrode F_Tx, but may be made of the same metal so as to simplify the manufacturing process.

In general, motion of atoms that form a crystal becomes active when temperature increases, and accordingly the number of defects in the crystal increases and prevents a movement of electrons. In addition, vibratory motion of atoms that form a lattice also becomes active and prevents the movement of electrons. Therefore, a conductor such as metal has increased resistance when temperature increases.

According to aspects of the present disclosure, the temperature sensor 118 formed to have a metal pattern disposed along a periphery of the second touch sensing unit 113 corresponding to the bezel area may detect a change in a resistance value according to a temperature so as to measure an internal temperature of the electronic device. The touch screen apparatus may correct the touch force level data according to the internal temperature, thereby more precisely sensing the touch force without variation according to a temperature.

Figure 7:
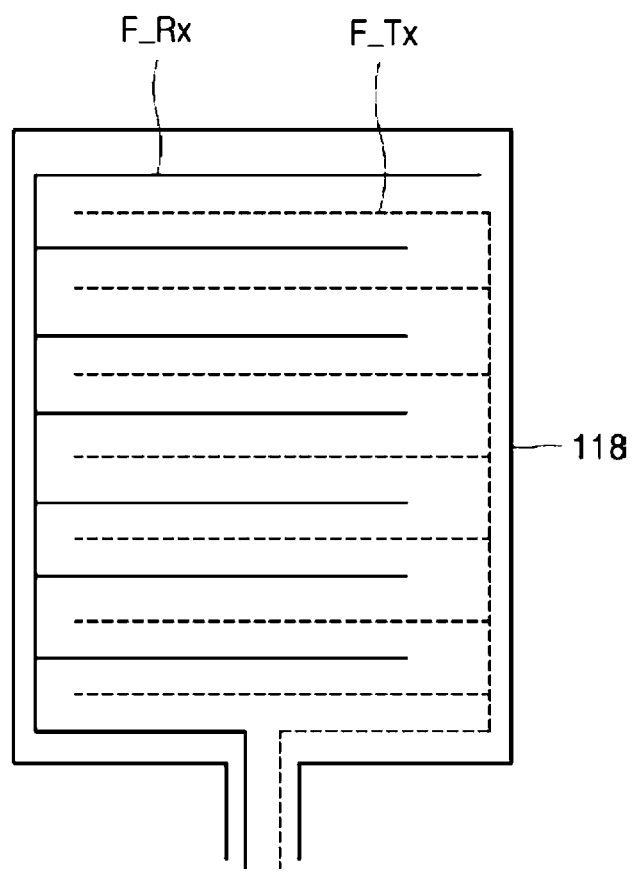
FIG. 7 is a schematic plan view showing a temperature sensor according to an aspect of the present disclosure.

FIG. 7, which is a plan view of the second touch sensing unit 113, schematically shows the force driving electrode F_Tx, the force sensing electrode F_Rx, and the temperature sensor 118. As shown in FIG. 7, the force driving electrode F_Tx and the force sensing electrode F_Rx each may be disposed in a shape of a plurality of fingers in the second touch sensing unit 113 corresponding to a display area of the display panel 300.

Here, fingers of the force driving electrode F_Tx and fingers of the force sensing electrode F_Rx may be alternately arranged, but the force driving electrode F_Tx and the force sensing electrode F_Rx are not limited to this shape. For example, when the touch input object applies a force to the force driving electrode F_Tx and the force sensing electrode F_Rx in a state where the fingers of the force driving electrode F_Tx and the fingers of the force sensing electrode F_Rx are overlapped with each other in a certain area with the resistor member 113c positioned therebetween, the fingers of the force driving electrode F_Tx and the fingers of the force sensing electrode F_Rx may come into contact with each other and sense a touch pressure.

The force driving electrode F_Tx and the force sensing electrode F_Rx may be disposed to intersect each other at right angles with the resistor member 113c positioned therebetween, or may be disposed to intersect each other at a predetermined angle with the resistor member 113c positioned therebetween.

The force driving electrode F_Tx and the force sensing electrode F_Rx are not disposed in a particular form but may be disposed in any form as long as they are able to contact each other to generate resistance when a touch occurs by the touch input object.

The temperature sensor 118 may be disposed in a pattern shape having a predetermined width along an edge area of the second touch sensing unit 113 corresponding to the bezel area of the display panel 300 so as to sense a temperature change resulting from heat or external heat. Also, the temperature sensor 118 may be disposed in an area corresponding to the display area of the display panel 300, that is, an area where the force driving electrode F_Tx and the force sensing electrode F_Rx are disposed. The temperature sensor 118 for measuring the internal temperature of the electronic device may be provided anywhere in the electronic device as long as it is able to precisely measure the internal temperature of the electronic device.

Referring back to FIG. 5, a substrate coupling member 113d may be disposed in a gap space GS (or an air gap) between the first substrate 113a and the second substrate 113b such that the first substrate 113a and the second substrate 113b are facingly coupled to each other. For example, the substrate coupling member 113d may be an adhesive made of a cushioning material. The substrate coupling member 113d may not only couple the first substrate 113a and the second substrate 113b to each other but also support the first substrate 113a and the second substrate 113b with the gap space GS positioned therebetween.

Figure 6:
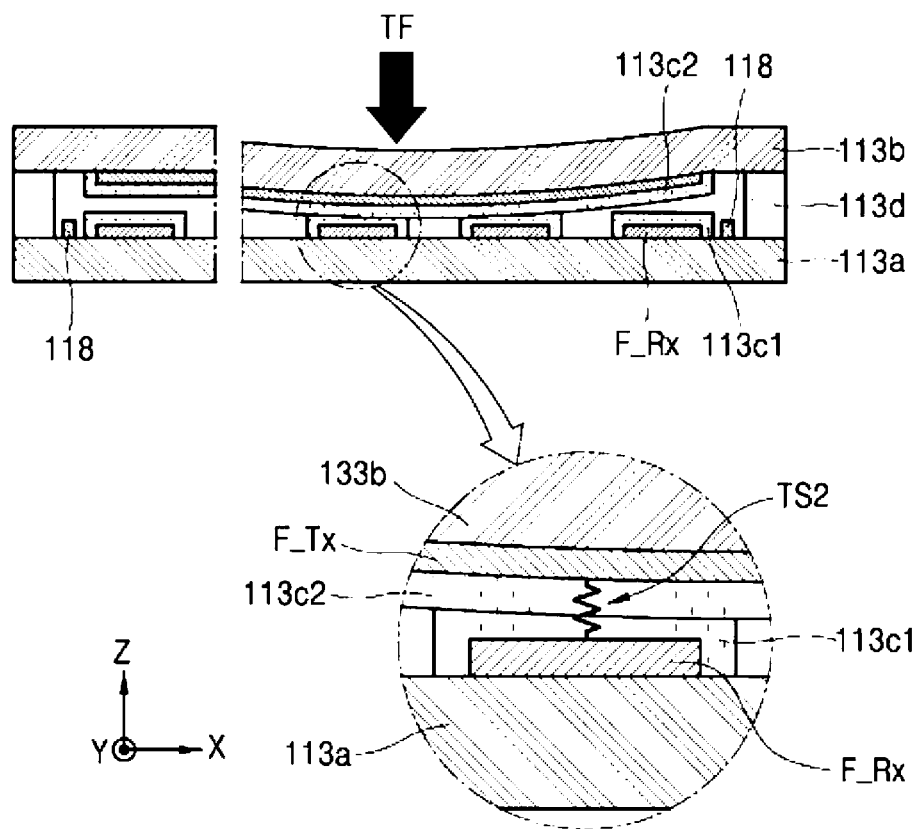
FIG. 6 shows a process of forming a second touch sensor in a second touch sensing unit shown in FIG. 5.

As shown in FIG. 6, in the second touch sensing unit 113 having the above-described structure, a touch force FT of the touch input object may bring a second resistor member pattern 113c2 in physical contact with a first resistor member pattern 113c1, and as a result, resistance may be formed in the resistor member 113c between the force driving electrode F_Tx and the force sensing electrode F_Rx, that is, the second sensor TS2. This resistance may allow a current according to the force driving signal supplied to the force driving electrode F_Tx to flow to the corresponding force sensing electrode F_Rx.

Accordingly, the touch driving circuit 130 may generate second touch raw data by amplifying a voltage corresponding to a current flowing in the second touch sensor TS2, and generate touch pressure level data based on the second touch raw data.

Meanwhile, the second substrate 113b may be sagged by its own weight and the weight of the display panel 300, and accordingly a pressure driving electrode F_Tx and a pressure sensing electrode F_Rx may be come in micro contact with each other even when no touch occurs. For this reason, even when no touch occurs, the second touch sensor TS2 may have a predetermined initial resistance value, not 0, and the second touch sensing unit 113 may correct the initial resistance value of the second touch sensor TS2.

The second touch sensing unit 113 having the above-described structure may be connected to the touch driving circuit 130 to sense the touch force of the touch input object with respect to the cover window 800.

Figure 8:
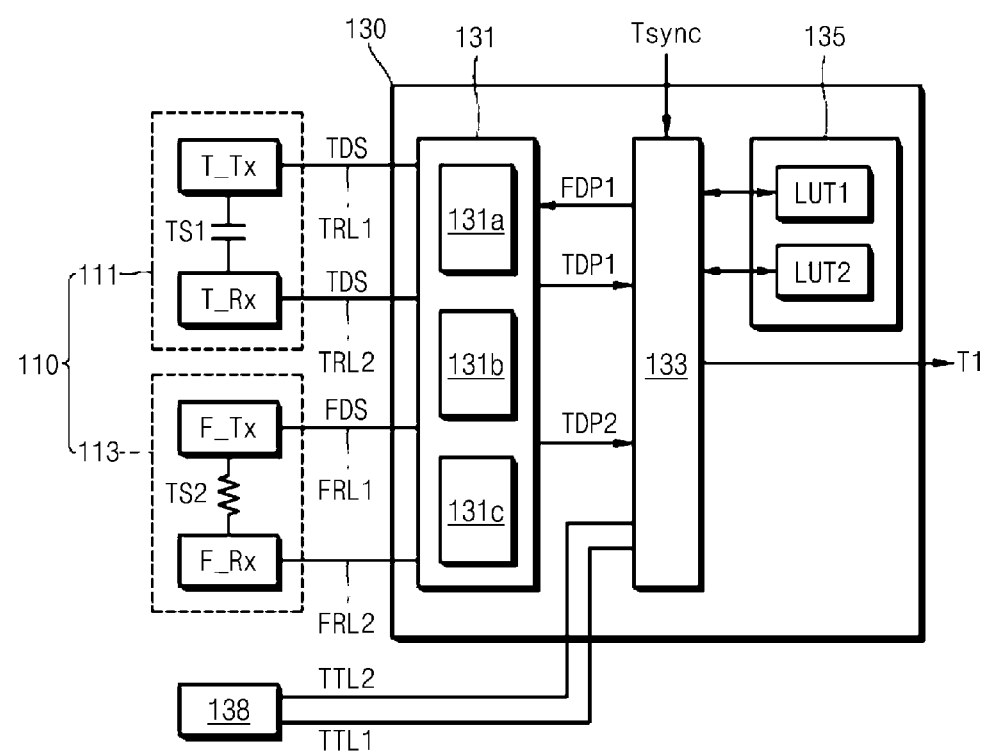
FIG. 8 is a block diagram showing a configuration of a touch sensing circuit of a touch screen apparatus according to an aspect of the present disclosure.

FIG. 8 shows a structure of the touch driving circuit 130 of the touch screen apparatus according to an aspect of the present disclosure.

As shown in FIG. 8, the touch driving circuit 130 may include one integrated circuit connected to the touch screen 110. Here, the touch driving circuit 130 may be connected to the touch screen 110 through a flexible circuit board, and may be mounted on the flexible circuit board. The touch driving circuit 130 may be electrically connected to the first touch sensing unit 111 and the second touch sensing unit 113 of the touch screen 110 and the temperature sensing unit 138.

The touch driving circuit 130 may be connected to a touch driving electrode T_Tx of the first touch sensing unit 111 through a plurality of first touch routing lines TRL1 on a one-to-one basis, and may be connected to a touch sensing electrode T_Rx of the first touch sensing unit 111 through a plurality of second touch routing lines TRL1 on a one-to-one basis.

Further, the touch driving circuit 130 may be connected to the force driving electrode F_Tx of the second touch sensing unit 113 through a first force routing line FRL1, and may be connected to the force driving electrode F_Tx of the second touch sensing unit 113 through a second force routing line FRL2. Furthermore, the touch driving circuit 130 may be connected to the temperature sensor 118 through first and second temperature routing lines TTL1 and TTL2 The touch driving circuit 130 may include a sensing unit 131, a touch control circuit 133, and a memory unit 135.

The sensing unit 131 may generate first touch raw data TRD1 according to a change in capacitance of each of the plurality of first touch sensors TS1 through a touch position sensed according to the control of the touch control circuit 133, and second touch raw data TRD2 according to a change in a resistance value of each of the plurality of second touch sensors TS2 through a touch force sensed according to the control of the touch control circuit 133. Here, the sensing unit 131 may simultaneously sense the touch position and the touch force, or may sense the touch force after sensing the touch position. Alternatively, it is also possible to sense the touch position after sensing the touch force.

The sensing unit 131 may include a driving signal generating unit 131a, a channel unit 131b, and a raw data generating unit 131c.

The driving signal generating unit 131a may generate a touch driving signal TDS having at least one touch driving pulse according to the control of the touch control circuit 133 and supply the touch driving signal TDS to the channel unit 131b. And, the drive signal generating unit 131a may generate a force driving signal FDS having a touch driving pulse based on force driving pulse information FDPI supplied from the touch control circuit 133 and supply the force driving signal FDS to the channel unit 131b. Here, the force driving signal FDS may have at least one touch driving pulse corresponding to the force driving pulse information FDPI including reference amplitude information, reference width information, and reference number information.

The channel unit 131b may supply the touch driving signal TDS output from the driving signal generating unit 131a to each of the plurality of touch sensing electrodes T_Rx through each of the plurality of first touch routing lines TRL1 according to a predetermined order based on a touch channel selection signal supplied from the touch control circuit 133, and may connect the raw data generating unit 131c to each of the plurality of touch sensing electrodes T_Rx through each of the plurality of the second touch routing lines TRL2 based on the touch channel selection signal.

The channel unit 131b may supply the force driving signal FDS output from the driving signal generating unit 131a to each of the plurality of force sensing electrodes F_Rx through each of the plurality of first force routing lines FRL1 according to a predetermined order based on a force channel selection signal supplied from the touch control circuit 133, and may connect the raw data generating unit 131c to each of the plurality of force sensing electrodes F_Rx through each of the plurality of the second force routing lines FRL2 based on the force channel selection signal.

The raw data generating unit 131c may generate first touch raw data TRD1 corresponding to a change in capacitance of each of the plurality of first touch sensors TS1 through each of the plurality of second touch routing lines TRL2, and supply the first touch raw data TRD1 to the touch control circuit 133, and may generate second touch raw data TRD2 corresponding to a change in a resistance value of each of the plurality of the second touch sensors TS2 through each of the plurality of the second force routing line FRL2 and supply the second touch raw data TRD2 to the touch control circuit 133.

The raw data generating unit 131c may generate a touch sensing signal in an analog form by amplifying the charge of the touch sensing electrode T_Rx according to the capacitance of the first touch sensor TS1, and generate first touch raw data by converting the touch sensing signal into a digital signal.

In this case, the raw data generating unit 131c may include a plurality of integration circuits including a comparator that compare a signal received from the touch sensing electrode T_Rx with a reference voltage to generate a touch sensing signal, or a plurality of integration circuits including a differential amplifier that amplifies a difference between signals received from two adjacent touch sensing lines T_Rx to generate a touch sensing signal.

Also, the raw data generating unit 131c may generate a force sensing signal in an analog form by amplifying the voltage of the force sense electrode F_Rx according to the resistance value of the second touch sensor TS2, and generate second touch raw data TRD2 by converting the force sensing signal into a digital signal.

In this case, the raw data generating unit 131c may include at least one inverting amplifier that amplifies a force according to the resistance value of the second touch sensor TS2 to generate a force sensing signal.

The touch control circuit 133, which is a microcontroller unit (MCU), may receive a touch sync signal Tsync supplied from the outside and control driving timing of the touch driving circuit 130 based on the received touch sync signal Tsync.

The touch control circuit 133 may generate touch force level data based on the second touch raw data TRD2. Also, the touch control circuit 133 may receive a temperature measured by the temperature sensor 118 of the temperature sensing unit 138 and determine an internal temperature of the electronic device (strictly speaking, an internal temperature of the second touch sensing unit 113). Thereafter, the touch control circuit 133 may correct the touch force level data based on a correction coefficient stored in a lookup table LUT of the memory unit 135 according to the measured temperature.

The lookup table LUT stored in the memory unit 135 of the touch control circuit 133 may be prepared by the following method.

In general, when temperature increases, the motion of the atoms that form a crystal as well as the vibratory motion of the atoms that form a lattice become active and prevent a movement of electrons in a material. Therefore, a conductor such as metal has increased resistance when temperature increases.

The temperature sensor 118 according to aspects of the present disclosure is configured on this basis. That is, the temperature sensor 118 made of metal such as Ag, Au, Al, or the like may measure a temperature change by measuring a resistance value according to a temperature.

$$R=R0[1+a(T-T0)]$$ Equation 1

Here, R is a resistance value at a temperature T, R0 is a reference resistance value at a reference temperature T0, and α is a temperature coefficient of resistance. The temperature coefficient of resistance is a characteristic coefficient inherent to a material. For example, a temperature coefficient of resistance of Ag is 0.0038, a temperature coefficient of resistance of Au is 0.0037, and a temperature coefficient of resistance of Al is 0.0043.

When the temperature sensor 118 is made of Ag and a reference resistance value is 90Ω at a reference temperature of 20° C., the resistance value of the temperature sensor 118 according to a temperature may be as shown in Table 1.

TABLE 1

| Temperature | Resistance value |
| --- | --- |
| 0° C. | 83.16Ω |
| 20° C. | 90Ω |
| 40° C. | 96.84Ω |
| 60° C. | 103.68Ω |
| 80° C. | 110.52Ω |

In the event that the temperature sensor 118 of the touch screen apparatus according to aspects of the present disclosure is made of Ag, the resistance value of the temperature sensor 118 may decrease by 6.84Ω when the temperature falls from 20° C. to 0° C., and increase by 6.84Ω when the temperature rises from 20° C. to 40° C., as shown in Table 1. Also, the resistance value of the temperature sensor 118 may increase by 10.68Ω when the temperature rises from 20° C. to 60° C., and increase by 20.52Ω when the temperature rises from 20° C. to 80° C.

Further, the touch force level data sensed by the second touch sensor TS2 of the second touch sensing unit 113 varies according to a temperature change. Hence, in aspects of the present disclosure, touch force level data according to a temperature is measured, and a first lookup table LUT1 to which the temperature and the touch force level data are mapped is prepared and stored in the memory unit 135 of the touch driving circuit 130. Table 2 shows the first lookup table LUT1.

TABLE 2

|  | 100 gf | 200 gf | 300 gf | 400 gf | 500 gf |
| --- | --- | --- | --- | --- | --- |
| 0° C. | 265 | 345 | 384 | 409 | 424 |
| 20° C. | 279 | 357 | 389 | 414 | 430 |
| 40° C. | 280 | 354 | 386 | 406 | 419 |
| 60° C. | 279 | 342 | 368 | 386 | 395 |
| 80° C. | 259 | 321 | 343 | 355 | 363 |

In Table 2, 100 gf, 200 gf, 300 gf, 400 gf, and 500 gf of the first row represent forces applied to the touch screen by an actual touch input object, and the second to fifth rows represent touch force level data generated by the sensing unit 131 after being measured by the temperature sensor 118. Even if the touch screen is touched with the same force, the actually generated touch force level data is different depending on a temperature, resulting in a touch error.

For example, when the touch input object touches a screen with a touch force of 500 gf at a temperature of 80° C., touch force level data of 363 may be sensed. According to the first lookup table LUT1, the touch force level data of 363 may correspond to the touch force of 500 gf at a temperature of 80° C. as well as a touch force of 200-300 gf at a room temperature in the range of 20° C.-40° C. Therefore, when the touch force of the touch input object is determined as the touch force of 200-300 gf at a room temperature in the range of 20° C.-40° C. based on the touch force level data, there is an error of 200-300 gf between the actual touch force of 500 gf and the touch force of 200-300 gf, resulting in a touch error.

In order to prevent such an error, aspects of the present disclosure may include the following steps: calculating a compensation coefficient value according to actual touch force level data for each temperature; preparing a second lookup table LUT2 with the compensation coefficient value; and storing the second lookup table LUT2 in the memory unit 135 to which temperatures and touch forces are mapped. Here, the second lookup table LUT2 may calculate and store the compensation coefficient value based on a temperature of 20° C., but the temperature is not limited to 20° C., and various temperatures may be set as a reference temperature.

A compensation coefficient α may be calculated by Equation 2, and Table 3 shows the second lookup table LUT2 prepared according to Equation 2.

$$\alpha = (P_0 - P_t)/P_0 \qquad \text{Equation 2}$$

Here, $P_0$ is touch force level data at a reference temperature (for example, 20° C.) and $P_t$ is touch force level data at a target temperature.

TABLE 3

|        | 100 gf | 200 gf | 300 gf | 400 gf | 500 gf |
|--------|--------|--------|--------|--------|--------|
| 0° C.  | 0.050  | 0.034  | 0.013  | 0.012  | 0.014  |
| 20° C. | 0.000  | 0.000  | 0.000  | 0.000  | 0.000  |
| 40° C. | -0.001 | 0.008  | 0.008  | 0.019  | 0.026  |
| 60° C. | 0.000  | 0.042  | 0.054  | 0.068  | 0.081  |
| 80° C. | 0.072  | 0.101  | 0.118  | 0.143  | 0.156  |

As shown in Table 3, compensation is not necessary at a reference temperature of 20° C., and accordingly all compensation coefficients represent 0. Compensation coefficients α of touch force level data corresponding to 100 gf, 200 gf, 300 gf, 400 gf and 500 gf at temperatures of 0° C., 40° C., 60° C. and 80° C. may have different values.

For example, when touch force level data corresponding to 500 gf at a temperature of 80° C. is 363, a touch force of 200-300 gf may be extracted based on a room temperature according to the first lookup table LUT1, and accordingly there is error of 200-300 gf between the actual touch force of 500 gf and the touch force of 200-300 gf. However, when the input touch force level data is compensated by a compensation coefficient (α=0.156) of the second lookup table LUT2, the touch force level data may become 419. According to the first lookup table LUT1, the touch force level data of 419 may correspond to a touch force of 400-500 gf based on a room temperature, so that the error may be reduced to about 100 gf or less.

Referring back to FIG. 8, the touch control circuit 133 may generate three dimensional touch information TI including touch position data and corrected touch force level data, and output the generated three dimensional touch information TI to the external host control circuit 500. Here, the touch position data may be digital information of each of an X-axis coordinate and a Y-axis coordinate with respect to the touch position, and the corrected touch force level data may be digital information of a Z-axis coordinate with respect to the touch position or a touch force level.

Figure 9:
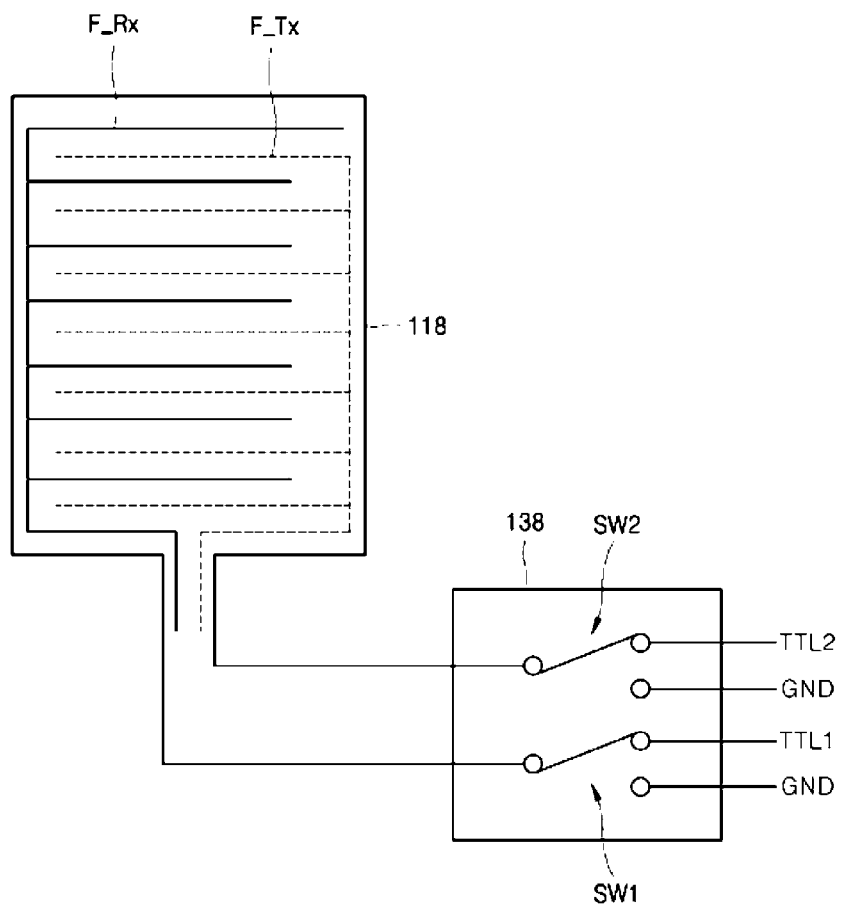
FIG. 9 shows a structure of a temperature sensing unit of FIG. 8.

As shown in FIG. 9, the temperature sensing unit 138 may include two switching elements SW1 and SW2. The switching element SW1 may be connected to one terminal of the temperature sensor 118 to switch between the first temperature routing line TTL1 and a ground GND. The second switching element SW2 may be connected to one terminal of the temperature sensor 118 to switch between the second temperature routing line TTL2 and the ground GND.

When the touch screen is not touched by the touch input object, the first switching element SW1 and the second switching element SW2 may be both switched to the ground GND, so that temperature sensor 118 may be connected to the ground GND to discharge static electricity generated in the electronic device to the ground GND.

When the touch screen is touched by the touch input object, the first switching element SW1 and the second switching element SW2 may be switched to the first temperature routing line TTL1 and the second temperature routing line TTL2, respectively, so that the temperature sensor 118 may be connected to the first temperature routing line TTL1 and the second temperature routing line TTL2, and the measured resistance value may be input to the temperature sensing unit 138 to measure an internal temperature of the electronic device.

In general, the internal temperature of the electronic device does not sharply change. In other words, when using the touch screen for a predetermined time, the temperature will be maintained almost constant. Therefore, it is not necessary to measure temperature every time the touch screen is touched and to newly compensate touch force level data every time according to a temperature change.

Therefore, only when the touch screen is first touched by the touch input object after a sleep mode in which the touch screen is not used for a predetermined period of time, the first switching element SW1 and the second switching element SW2 may be driven. Here, the first switching element SW1 and the second switching element SW2 may be respectively connected to the first temperature routing line TTL1 and the second temperature routing line TTL2 to perform compensation based on temperature measurement. Thereafter, when the electronic device is used, the first switching element SW1 and the second switching element SW2 may be connected to ground GND to discharge the static electricity.

Hereinafter, a method of correcting touch force level data according to a temperature of the touch screen apparatus configured as above will be described.

Figure 10:
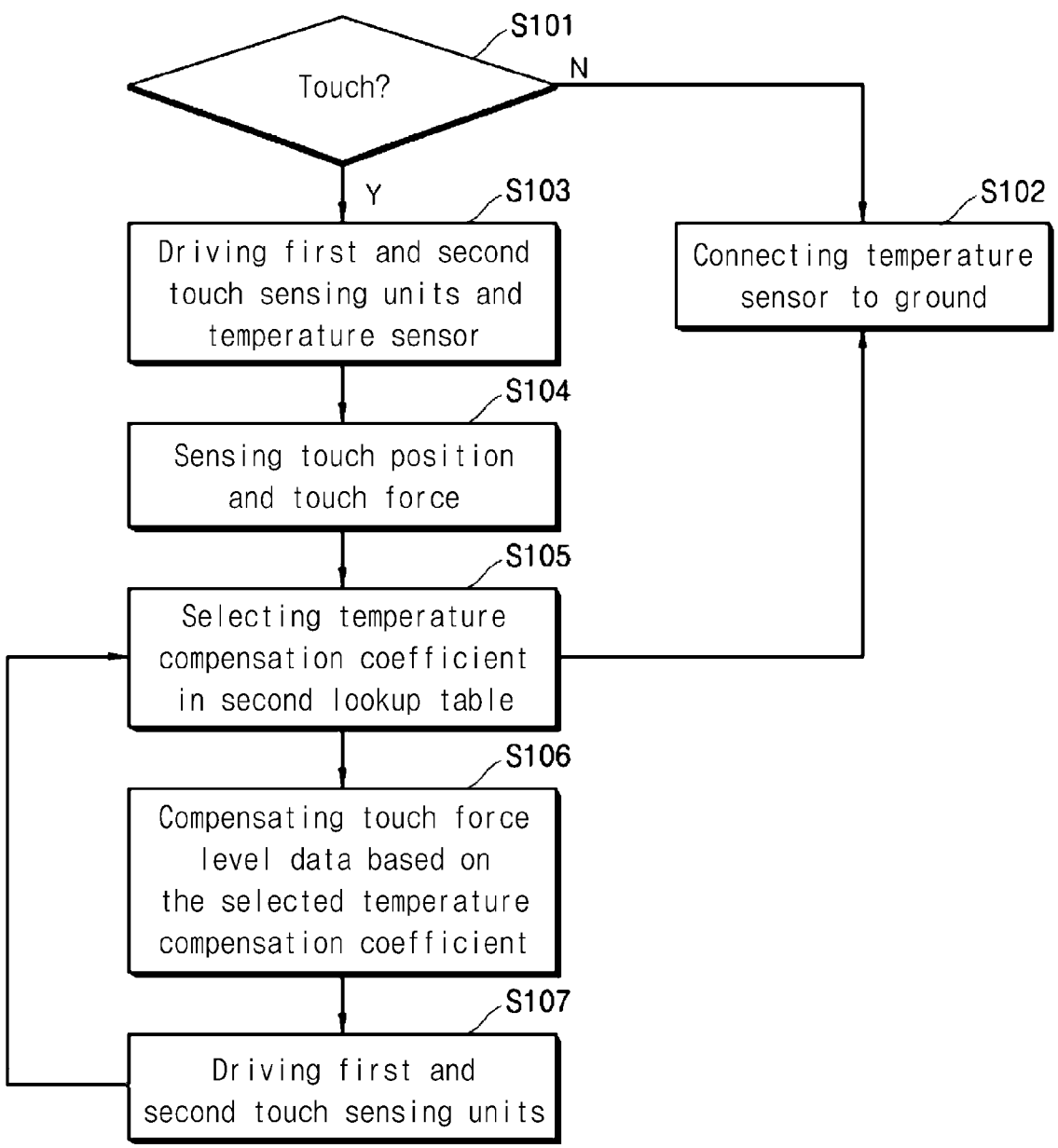
FIG. 10 is a flowchart showing a method of compensating a touch force according to a temperature of a touch screen apparatus according to an aspect of the present disclosure.

FIG. 10 is a flow chart showing a method of compensating a touch force according to a temperature of the touch screen apparatus according to an aspect of the present disclosure.

First, when a user of the electronic device does not touch the touch screen apparatus with the touch input object, the first and second switching elements SW1 and SW2 of the temperature sensing unit 138 may be connected to the ground GND so that the static electricity of the electronic device is discharged to the outside through the temperature sensor 118 at steps of S101 and S102.

When the user touches the touch screen apparatus with the touch input object, the first touch sensing unit 111 may be driven to sense a touch position of the touch input object, and the second touch sensing unit 113 may be driven to sense a touch force of the touch input object at steps of S103 and S104.

Here, the touch driving circuit 130 may generate first touch raw data based on a signal input from the first touch sensing unit 111 and generate second touch row data based on a signal input from the second touch sensing unit 113, and then may generate touch position data based on the first touch raw data, and generate touch force level data based on the second touch raw data.

Subsequently, the touch driving circuit 130 may select a temperature compensation coefficient of the second lookup table LUT2 stored in the memory unit 135 based on the measured temperature of the temperature sensor 118 input from the temperature sensing unit 138, and then compensate the touch force level data based on the selected temperature compensation coefficient to generate corrected touch force level data at steps of S105 and S106.

Although not shown in the drawings, the touch driving circuit 130 may generate three dimensional touch information TI including touch position data and corrected touch force level data, and output the generated three dimensional touch information TI to the external host control circuit 500. Here, the touch position data may be digital information of each of an X-axis coordinate and a Y-axis coordinate with respect to the touch position, and the corrected touch force level data may be digital information of a Z-axis coordinate with respect to the touch position or a touch force level.

The compensation of the touch force level data according to a temperature is only required for the first time. For this reason, after the temperature compensation coefficient is selected, the first switching element SW1 and the second switching element SW2 may be continuously connected to the ground GND so that the static electricity is discharged to the outside.

As described above, the touch driving circuit 130 may generate and output the three dimensional touch information TI including the touch position data and the corrected touch force level data to the external host control circuit 500. Thereafter, the touch driving circuit 130 may generate and output a touch driving signal TDS and a force driving signal FDS to the first touch sensing unit 111 and the second touch sensing unit 113, respectively, so as to sense a touch of a new touch input object at step of S107. The generated touch force level data may be compensated by the already selected temperature compensation coefficient, thereby making it possible to perform a precise touch all the time.

According to the aspects of the present disclosure, the touch driving circuit may compensate the touch force level data based on a temperature sensed by the temperature sensor provided in the second touch sensing unit. Thus, a second touch sensor may more precisely sense a touch force without variation according to a temperature.

Also, the temperature sensor may be connected to the ground except when no touch or a first touch occurs, and thus it is possible to easily discharge static electricity occurring in the electronic device through the temperature sensor.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

<List of Reference Numerals>

| | |
|---|---|
| 110: Touch screen | 111: First touch sensing unit |
| 113: Second touch sensing unit | 118: Temperature sensor |
| 130: Touch driving circuit | 131: Sensing unit |
| 133: Touch control circuit | 135: Memory unit |
| 138: Temperature sensing unit | 300: Display panel |
| 400: Display panel driving circuit | 500: Host control circuit |
| 700: Housing | 800: Cover window |

What is claimed is:

1. A touch screen apparatus, comprising:
a touch screen including a touch sensor;
a temperature sensing unit having a temperature sensor measuring a temperature of the touch screen;
a touch driving circuit connected to the touch screen, generating touch position data and touch force level data, and correcting the touch force level data according to a temperature input from the temperature sensing unit; and
a switching element selectively connecting the temperature sensor to a ground or the touch driving circuit.

2. The touch screen apparatus of claim 1, wherein the touch sensor includes:
a first touch sensing unit measuring a touch position of a touch input object; and
a second touch sensing unit measuring a touch force of the touch input object.

3. The touch screen apparatus of claim 2, wherein the second touch sensing unit includes:
a force sensing electrode disposed on a first substrate;
a force driving electrode disposed on a second substrate; and
a resistor member disposed between the force sensing electrode and the force driving electrode.

4. The touch screen apparatus of claim 3, wherein the temperature sensing unit includes:
a temperature sensor disposed on at least one of the first substrate and the second substrate.

5. The touch screen apparatus of claim 4, wherein the temperature sensor is a metal wiring disposed along a periphery of at least one of the first substrate and the second substrate.

6. The touch screen apparatus of claim 4, wherein the switching element connects the temperature sensor to the touch driving circuit only when a first touch occurs after a sleep mode of the touch screen.

7. The touch screen apparatus of claim 4, wherein the temperature sensor connected to the ground discharges static electricity to outside.

8. The touch screen apparatus of claim 2, wherein the touch driving circuit includes:
a sensing unit generating a touch driving signal, supplying the touch driving signal to the first touch sensing unit and generating a first touch raw data according to a touch position input from the first touch sensing unit, and generating a force driving signal, supplying the force driving signal to the second touch sensing unit and generate a second touch raw data according to a touch force input from the second touch sensing unit; and a touch control circuit controlling driving timing according to a touch sync signal, generating touch force level data based on the second touch raw data, and correcting the touch force level data based on a temperature input from the temperature sensing unit.

9. The touch screen apparatus of claim 8, wherein the touch driving circuit further comprises a memory unit having first and second lookup tables and supplying a temperature compensation coefficient to a driving control circuit.

10. The touch screen apparatus of claim 9, wherein the first lookup table has a temperature and the touch force level data that are mapped thereof.

11. The touch screen apparatus of claim 10, wherein the second lookup table has a temperature and the touch force level data that are mapped thereof.

12. The touch screen apparatus of claim 8, wherein the touch control circuit generates and outputs three dimensional touch information including touch position data and corrected touch force level data.

13. An electronic device, comprising:
a display panel;
a display panel driving circuit connected to the display panel;
a touch screen apparatus disposed on the display panel and including a touch screen including a touch sensor, a temperature sensing unit measuring a temperature of the touch screen, a touch driving circuit connected to the touch screen, generating touch position data and touch force level data, and correcting the touch force level data according to a temperature input from the temperature sensing unit, and a switching element selectively connecting the temperature sensing unit to a ground or the touch driving circuit and
a host control circuit to control the display panel driving circuit and the touch screen apparatus.

14. A touch screen apparatus, comprising:
a touch screen having first and second touch sensing units, wherein the first touch sensing unit measures a touch position of a touch input object and the second touch sensing unit measures a touch force of the touch input object;
a temperature sensing unit having a temperature sensor measuring a temperature of the touch screen; and
a touch driving circuit connected to the touch screen, generating touch position data and touch force level data, and correcting the touch force level data in accordance with the measured temperature at the temperature sensing unit,
wherein the temperature sensor is connected to the touch driving circuit when a first touch is detected at the first and second touch sensing units after the touch screen is in a sleep mode and connected to ground when no touch input object is detected at the first and second touch sensing units.

15. The touch screen apparatus of claim 14, wherein the temperature sensing unit further comprises a switching element selectively connecting the temperature sensor to the ground or the touch driving circuit.

16. The touch screen apparatus of claim 14, wherein the second touch sensing unit includes:
a force sensing electrode disposed on a first substrate;
a force driving electrode disposed on a second substrate; and
a resistor member disposed between the force sensing electrode and the force driving electrode.

17. The touch screen apparatus of claim 14, wherein the temperature sensor connected to the ground discharges static electricity.

18. The touch screen apparatus of claim 14, wherein the touch driving circuit includes:
a sensing unit generating a touch driving signal, supplying the touch driving signal to the first touch sensing unit and generating a first touch raw data according to a touch position input from the first touch sensing unit, and generating a force driving signal, supplying the force driving signal to the second touch sensing unit and generate a second touch raw data according to a touch force input from the second touch sensing unit; and
a touch control circuit controlling driving timing according to a touch sync signal, generating touch force level data based on the second touch raw data, and correcting the touch force level data based on a temperature input from the temperature sensing unit.

19. The touch screen apparatus of claim 18, wherein the touch driving circuit further comprises a memory unit having first and second lookup tables and supplying a temperature compensation coefficient to a driving control circuit.

20. The touch screen apparatus of claim 18, wherein the touch control circuit generates and outputs three dimensional touch information including touch position data and corrected touch force level data.

* * * * *